United States Patent
Jonsson (10) Patent No.: US 7,889,800 B2
(45) Date of Patent: Feb. 15, 2011

(54) MEMORY-SAVING METHOD FOR GENERATING SOFT BIT VALUES FROM AN OFDM SIGNAL

(75) Inventor: Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 811 days.

(21) Appl. No.: 11/755,887

(22) Filed: May 31, 2007

(65) Prior Publication Data

US 2008/0298510 A1 Dec. 4, 2008

(51) Int. Cl.
  *H04L 27/28* (2006.01)
(52) U.S. Cl. ........................................ 375/260; 375/261
(58) Field of Classification Search ............... 375/260
  See application file for complete search history.

(56) References Cited

U.S. PATENT DOCUMENTS

| | | | | |
|---|---|---|---|---|
| 4,494,240 | A * | 1/1985 | Payton | 375/316 |
| 5,621,762 | A * | 4/1997 | Miller et al. | 375/298 |
| 6,603,734 | B1 | 8/2003 | Oksanen | |
| 6,862,552 | B2 | 3/2005 | Goldstein et al. | |
| 7,020,272 | B2 * | 3/2006 | Tanrikulu | 379/386 |
| 7,106,810 | B2 | 9/2006 | Collins et al. | |
| 7,136,435 | B2 | 11/2006 | Kolze | |
| 7,154,966 | B2 * | 12/2006 | Malm et al. | 375/340 |
| 7,190,747 | B2 * | 3/2007 | MacLeod et al. | 375/344 |
| 7,197,090 | B1 * | 3/2007 | Berger et al. | 375/317 |
| 7,349,470 | B2 * | 3/2008 | Hillery | 375/233 |
| 7,352,832 | B1 * | 4/2008 | Lewis et al. | 375/345 |
| 7,376,195 | B2 * | 5/2008 | Jonsson et al. | 375/262 |
| 7,418,240 | B2 * | 8/2008 | Hsu et al. | 455/67.13 |
| 7,680,214 | B2 * | 3/2010 | Bui | 375/316 |
| 2004/0091058 | A1 * | 5/2004 | Tosato et al. | 375/261 |
| 2004/0198276 | A1 * | 10/2004 | Tellado et al. | 455/132 |
| 2004/0233976 | A1 * | 11/2004 | Han et al. | 375/147 |
| 2004/0236379 | A1 * | 11/2004 | Bardy et al. | 607/9 |
| 2004/0264591 | A1 * | 12/2004 | Malm et al. | 375/261 |
| 2005/0002472 | A1 | 1/2005 | Lee et al. | |
| 2005/0075103 | A1 * | 4/2005 | Hikokubo et al. | 455/423 |
| 2005/0163200 | A1 * | 7/2005 | Jonsson et al. | 375/148 |
| 2005/0169165 | A1 * | 8/2005 | Cimini et al. | 370/206 |

(Continued)

FOREIGN PATENT DOCUMENTS

EP  1024634 A2  8/2000

(Continued)

*Primary Examiner*—Chieh M Fan
*Assistant Examiner*—Santiago Garcia
(74) *Attorney, Agent, or Firm*—Coats & Bennett, P.L.L.C.

(57) ABSTRACT

Methods and receiver circuits for determining and employing decision boundary estimates for use in de-mapping QAM symbols in an OFDM receiver are disclosed. The disclosed methods efficiently use memory resources, while taking account of the frequency-selective and time-varying nature of the signal propagation. An OFDM receiver calculates a decision boundary estimate using QAM-modulated symbols selected from a group of OFDM tones and determines soft bit values for symbols selected from an adjacent tone using the decision boundary estimate. The receiver updates the decision boundary estimate using the symbols from the adjacent tone and determines soft bit values for symbols selected from a next-adjacent tone using the updated decision boundary estimate. Once the decision boundary estimate has been updated and the soft bit values have been determined for each tone, the symbol data for that tone may be discarded.

21 Claims, 7 Drawing Sheets

U.S. PATENT DOCUMENTS

| | | | |
|---|---|---|---|
| 2006/0222091 A1* | 10/2006 | Rhodes | 375/260 |
| 2006/0285603 A1 | 12/2006 | Yim et al. | |
| 2007/0002818 A1 | 1/2007 | Steer et al. | |
| 2007/0047431 A1* | 3/2007 | Nishio et al. | 370/203 |
| 2007/0071150 A1* | 3/2007 | Yang et al. | 375/347 |
| 2007/0116142 A1* | 5/2007 | Molander | 375/260 |
| 2007/0140212 A1* | 6/2007 | Gaikwad et al. | 370/350 |
| 2007/0230632 A1* | 10/2007 | Bai et al. | 375/341 |
| 2007/0237244 A1* | 10/2007 | Huang et al. | 375/260 |
| 2008/0112478 A1* | 5/2008 | Kawano | 375/230 |
| 2008/0152027 A1* | 6/2008 | Kalluri et al. | 375/260 |
| 2008/0187032 A1* | 8/2008 | Pande et al. | 375/227 |
| 2008/0198942 A1* | 8/2008 | Akella et al. | 375/260 |
| 2008/0221632 A1* | 9/2008 | Bardy et al. | 607/5 |
| 2008/0247487 A1* | 10/2008 | Cai et al. | 375/296 |
| 2008/0291856 A1* | 11/2008 | Li et al. | 370/311 |
| 2008/0298510 A1* | 12/2008 | Jonsson | 375/326 |
| 2009/0016468 A1* | 1/2009 | Ghazi-Moghadam et al. | 375/340 |
| 2009/0161781 A1* | 6/2009 | Kolze | 375/260 |

FOREIGN PATENT DOCUMENTS

| | | |
|---|---|---|
| EP | 1724959 | 11/2006 |
| GB | 2388760 A | 11/2003 |
| WO | 02/098090 A1 | 12/2002 |
| WO | 2006/105459 | 10/2006 |

* cited by examiner

MEMORY-SAVING METHOD FOR GENERATING SOFT BIT VALUES FROM AN OFDM SIGNAL

BACKGROUND

1. Technical Field

The present invention generally relates to methods and apparatus for processing received Orthogonal Frequency Division Multiplexing (OFDM) signals, and particularly relates to determining and updating decision boundary estimates used for generating soft bit values from QAM-modulated symbols.

2. Background

OFDM technology is a key component of the $3^{rd}$-Generation Partnership Project's (3GPP) "Long-Term Evolution" (LTE) initiative. Coupled with other evolving technologies, including Multiple-Input Multiple-Output (MIMO), an advanced antenna technology, the LTE initiative promises much higher data rates for mobile wireless users than are currently available, along with more efficient use of radio frequency spectrum.

As will be well understood by those skilled in the art, OFDM is a digital multi-carrier modulation scheme employing a large number of closely-spaced orthogonal sub-carriers. Each sub-carrier is separately modulated using conventional modulation techniques, including quadrature amplitude modulation (QAM). A QAM-modulated signal essentially comprises two carrier signals, in quadrature (i.e. ninety degrees out of phase with each other), which are separately amplitude modulated. A typical signal might use 16-QAM, which maps 4 bits to each symbol, or 64-QAM, which maps 6 bits to each symbol. Accordingly, an OFDM signal comprises a large number of sub-carriers, or "tones," any or each of which may be separately modulated using QAM.

A transmitted OFDM signal undergoes various transformations and distortions as it travels through the propagation channel and is processed in a receiver. As a result, the absolute amplitude of any particular sub-carrier of the received OFDM signal at any given time is generally unpredictable. However, because QAM signals include an amplitude component, amplitude thresholds are needed to convert—"de-map"—the received QAM symbol into the original data bits. As a result, these amplitude thresholds, or "decision boundaries" must be derived from the received signal before the symbols can be de-mapped. Decision boundaries can be estimated from amplitude information derived from a number of received symbols.

Generally speaking, analyzing a larger number of received symbols can yield improved decision boundary estimates. However, analyzing a large number of received symbols requires that those symbols be stored until a decision boundary estimate is generated and the symbols are de-mapped. The system memory required for this storage is costly, in terms of increased integrated circuit size as well as increased power consumption.

In addition, because of frequency-selective effects of the propagation channel, symbols from a sub-carrier at one end of the OFDM signal may be of little use in estimating a decision boundary for symbols derived from a sub-carrier at the opposite end. Likewise, time-varying effects of the propagation channel will cause the amplitudes of the received signals to vary over time. These challenges complicate the design and implementation of efficient and robust decision boundary estimation algorithms.

SUMMARY

Methods and receiver circuits for determining and employing decision boundary estimates for use in de-mapping QAM symbols in an OFDM receiver are disclosed. The disclosed methods efficiently use memory resources, while taking account of the frequency-selective and time-varying nature of the signal propagation, and thus facilitate the construction of robust, cost-effective OFDM receivers.

In several embodiments, a method for determining soft bit values for QAM-modulated symbols in an OFDM receiver is disclosed, wherein a decision boundary estimate for use in generating soft bits is calculated using received symbols selected from a group of OFDM tones. The decision boundary estimate is used to determine soft bit values corresponding to symbols selected from a tone adjacent to the initial group of tones. These symbols from the adjacent tone are also used to update the decision boundary estimate. The updated decision boundary estimate is then used to determine soft bits from a next-adjacent tone.

In some embodiments, the decision boundary estimate may further be calculated based on a measured signal-to-interference ratio. In addition, decision boundary estimates determined for a particular OFDM tone may be filtered, or smoothed, using prior decision boundary estimates derived during a prior measurement interval. In some embodiments, a change in transmit amplitude between measurement intervals may be detected, whereupon the decision boundary estimate is calculated based on the transmit amplitude change.

DETAILED DESCRIPTION

Figure 1:
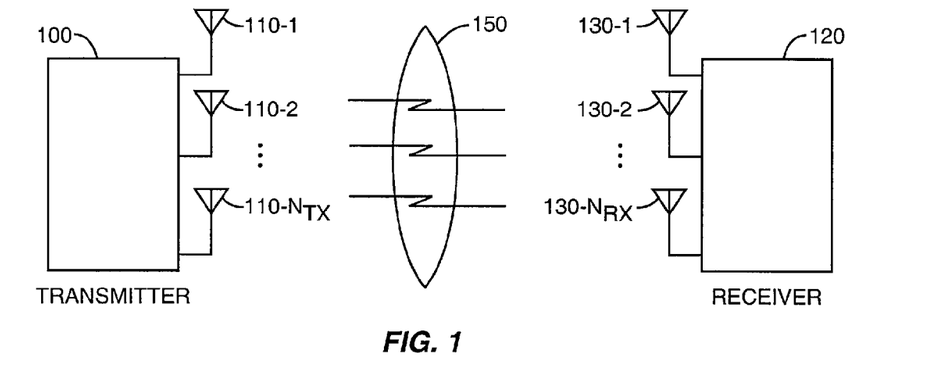
FIG. 1 is a block diagram of one embodiment of a wireless communications system.

FIG. 1 illustrates a wireless digital communications system employing OFDM as well as multiple-input, multiple-output (MIMO) technology. Transmitter 100 transmits an OFDM signal using multiple antenna elements 110-1, 110-2 . . . 110-$N_{TX}$. Similarly, receiver 120 receives OFDM signals through receive antennas 130-1, 130-2 . . . 130-$N_{RX}$. Of course, FIG. 1 illustrates only one link in a wireless communications system. In general, transmitter 100 may be but a single component in a wireless communications system, such as a wireless base station, and will generally be accompanied by a wireless receiver. Likewise, receiver 120, which may be part of a mobile terminal, will generally be accompanied by a corresponding transmitter subsystem.

In any event, signals transmitted from transmitter 100 to receiver 120 pass through a propagation channel 150. Although illustrated in FIG. 1 as comprising only the path between the receive and transmit antennas, the propagation channel 150 is often treated for analytical purposes as including effects caused by analog components in the transmitter 100 and receiver 120. Regardless, a wideband radio signal will experience various transformations and distortions as it passes through the propagation channel 150. For example, the propagation channel 150 may be frequency selective, so that some frequency components of the transmitted signal are attenuated more or less than other components. In addition, a particular physical environment will often result in multi-path distortion, caused by the simultaneous reception at the receiver of signal components arriving via different paths. Various technologies and techniques, including, for example, the use of multiple antenna elements as shown in FIG. 1, are employed to combat these distortions.

Figure 2A:
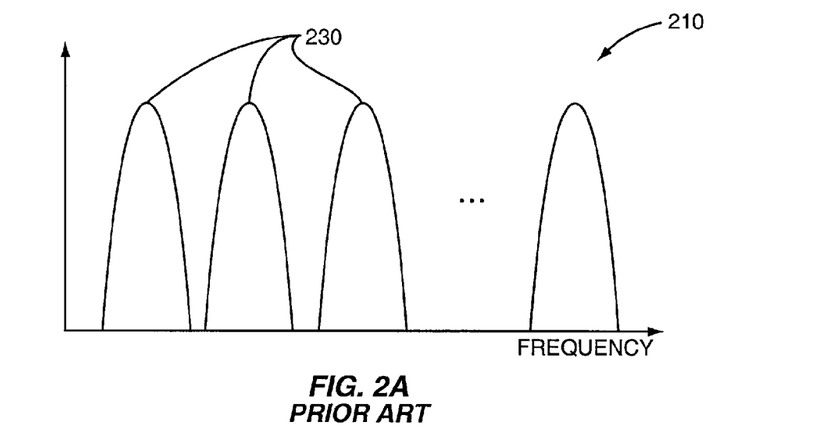
FIG. 2A is a frequency spectrum diagram for a multi-carrier signal.

Signals employed in wireless communications systems are usually constructed to combat one or more of these problems. FIG. 2A illustrates one approach, namely, the use of a multi-carrier communications signal. The composite signal 210 comprises several sub-carriers 230. Each sub-carrier is separately modulated with data. Dividing a signal into sub-carriers 230 creates several advantages. If the bandwidth of the individual sub-carriers is small enough, each sub-carrier will experience flat fading, even if the overall radio propagation environment is frequency-selective. In addition, if the symbol modulation rate is selected so that the symbol duration exceeds the maximum delay spread caused by the propagation channel 150, then inter-symbol interference is less troublesome.

Figure 2B:
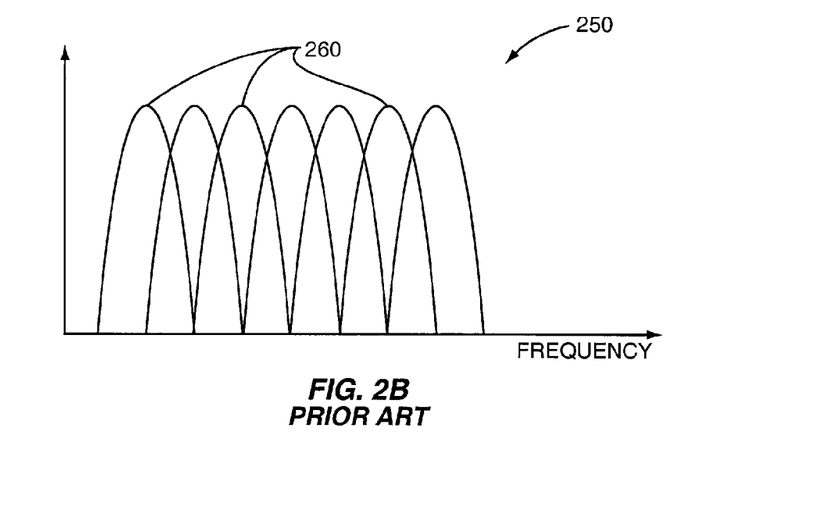
FIG. 2B diagrams an frequency spectrum for an OFDM signal.

FIG. 2B illustrates the construction of an OFDM signal 250. By ensuring that the individual sub-carriers 260, often called "tones", are orthogonal to each other, the spectrum of one tone 260 may overlap the next tone 260, without causing crosstalk between the tones. Orthogonality between the tones is achieved using the properties of the discrete Fourier transform (DFT); creation of OFDM signals using the inverse DFT is well known by those skilled in the art.

Figure 3:
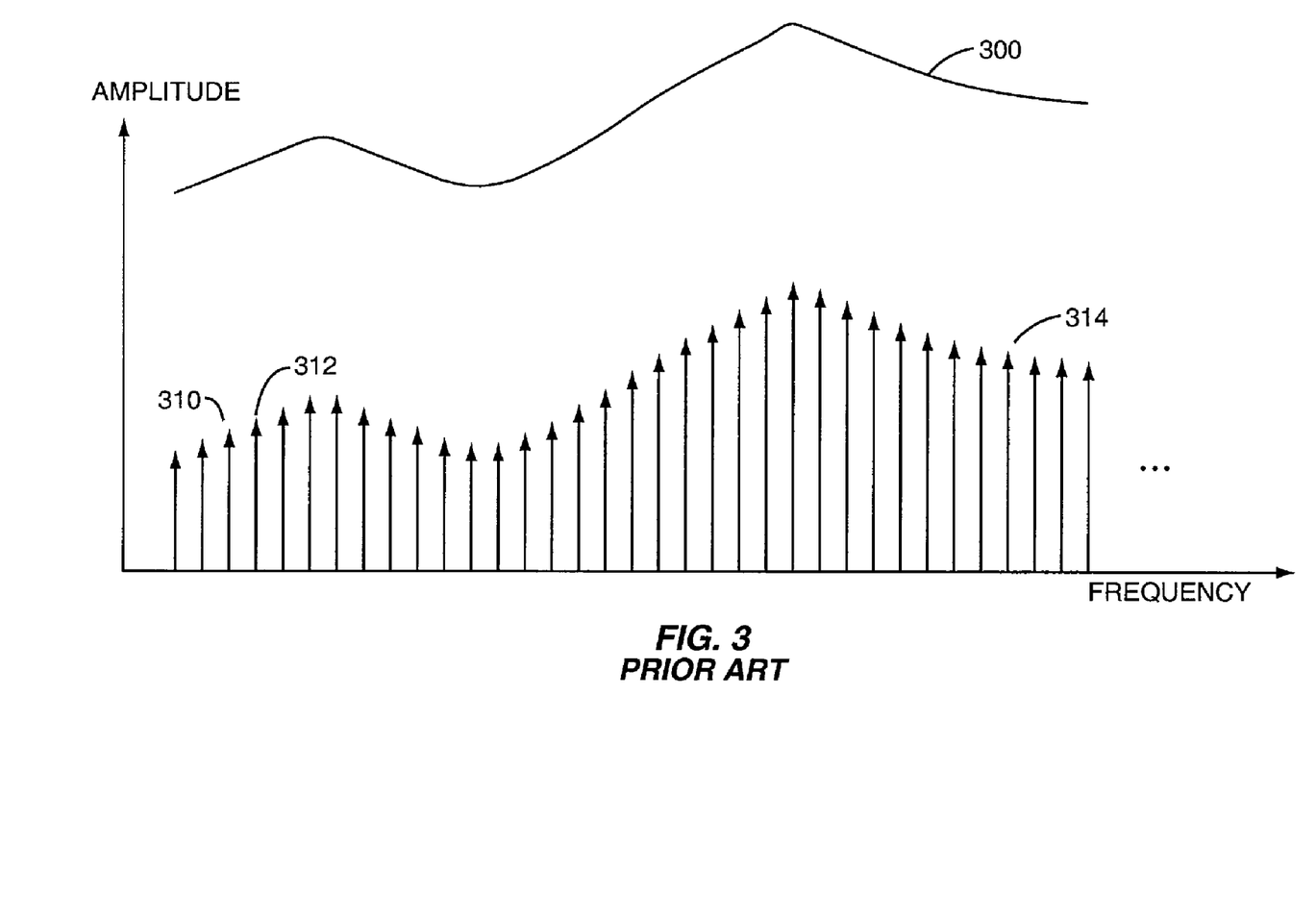
FIG. 3 illustrates a frequency-selective propagation channel response versus OFDM tones.

FIG. 3 is a simplified representation of the impact of frequency selectivity on a signal comprising many OFDM tones. As explained above, the propagation channel 150 will generally be frequency selective, particularly for a wideband signal. Thus, the amplitudes of the OFDM tones will vary across the OFDM signal bandwidth; this variation is illustrated in FIG. 3 by frequency response curve 300. It should be noted that the variation across frequency response curve 300 is greatly exaggerated. In a practical application, the variation in amplitude between one tone and the next will be relatively small. However, because in practice an OFDM signal may include thousands of tones, the variation across the entire OFDM signal may be quite large. Thus, it may be observed generally that knowledge of the amplitude of tone 310 is useful in estimating the amplitude of a nearby tone 312, but is of less use in estimating the amplitude of a tone 314 situated much farther away in frequency.

Figure 4:
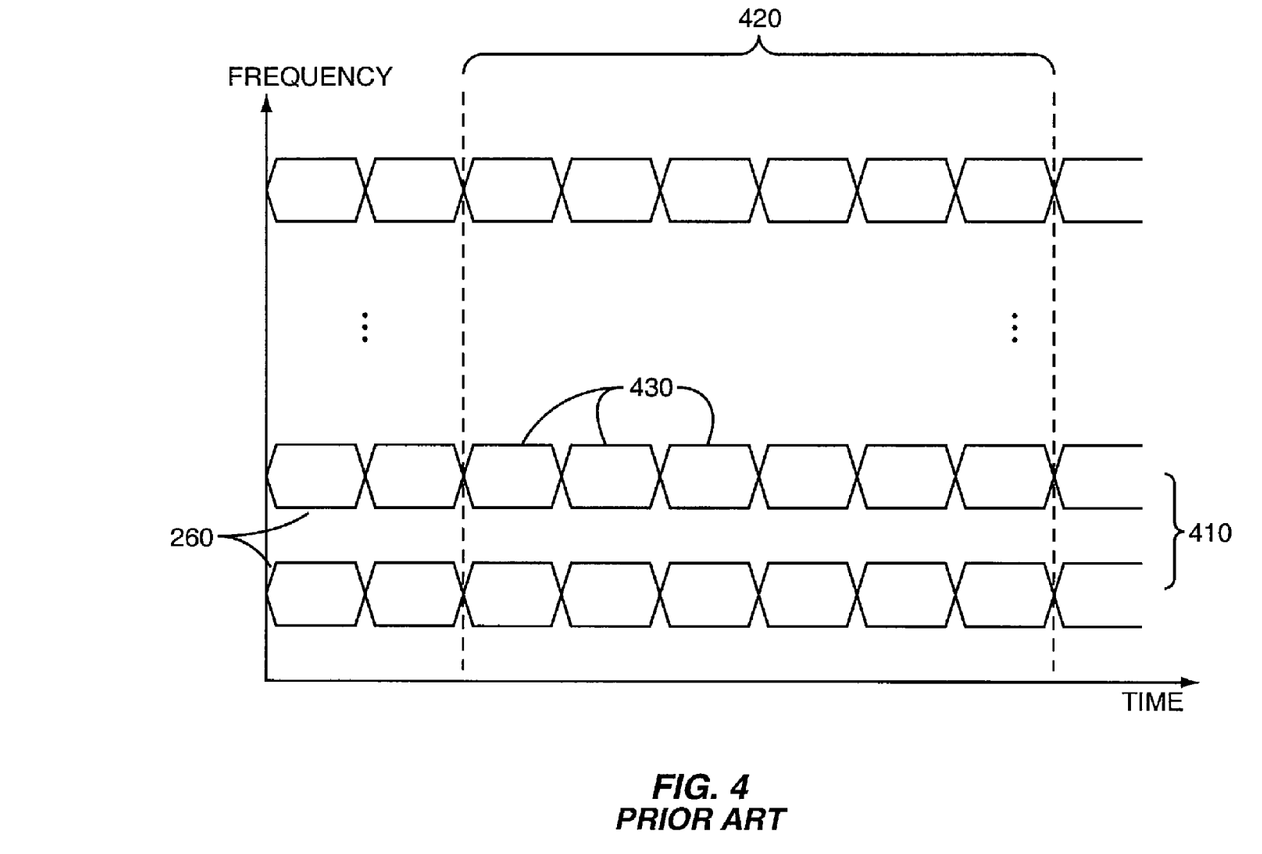
FIG. 4 illustrates a time-versus-frequency schematic for an OFDM signal.

FIG. 4 illustrates in more detail the construction of an OFDM signal. In FIG. 4, frequency increases along the vertical axis, while time is plotted horizontally. Hence, FIG. 4 depicts a time-domain representation of several OFDM tones 260, each separated by a sub-carrier spacing 410. A typical value for the sub-carrier spacing 410 is 15 kHz. Each tone 260 is divided along the time domain into a series of sub-frames 420; a typical sub-frame duration is 0.5 milliseconds. Within a sub-frame 420, each tone 260 comprises a series of symbols 430; a typical sub-frame may comprise 6 or 7 symbols 430. As will be readily understood by those skilled in the art, each symbol 430 comprises a cyclic prefix (not shown), which essentially provides a guard interval to prevent or reduce the impact of inter-symbol interference caused by delay spread in the propagation channel 150.

Figure 5:
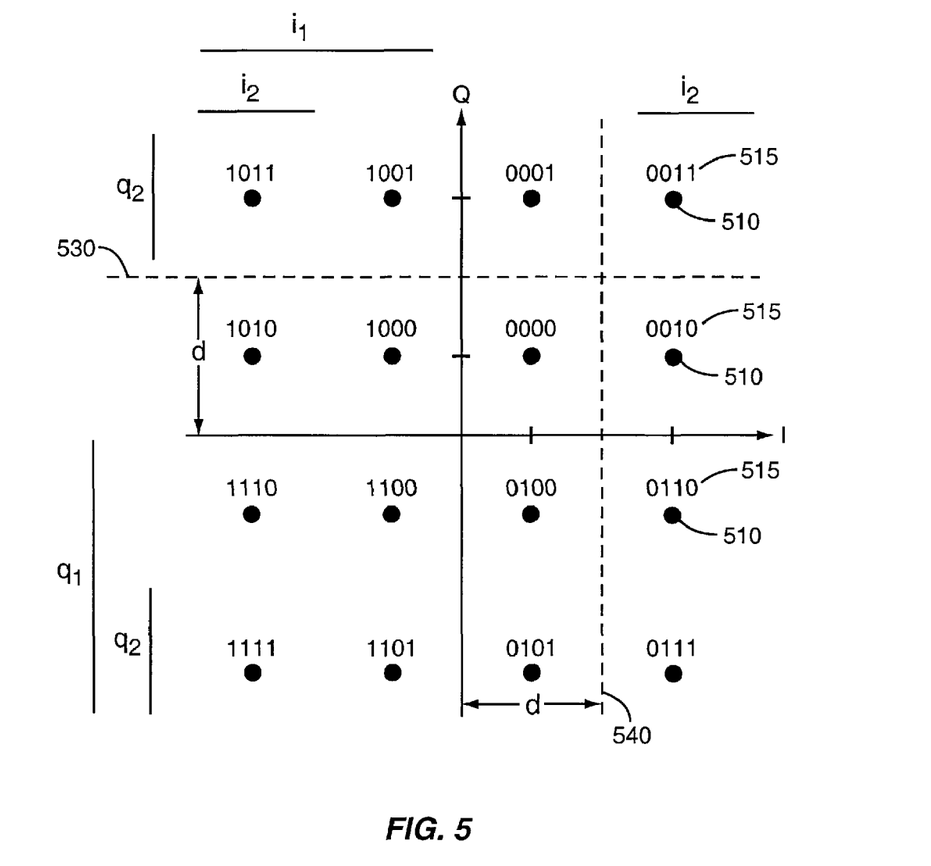
FIG. 5 illustrates a 16-QAM modulation constellation.

Symbols 430 may be modulated using any of a variety of modulation schemes. Of present interest, symbols 430 may be modulated using QAM. FIG. 5 illustrates the constellation (i.e. the possible symbol values) for a 16-QAM signal. The x-axis, labeled "I", represents the amplitude values that may be assumed by one component (the in-phase component) of the signal, while the y-axis, labeled "Q", represents the amplitude values assumed by the quadrature component. Sixteen possible combinations of these in-phase and quadrature amplitude values are possible. Each combination, illustrated by a constellation point 510 in the diagram, corresponds to a binary value 515. The sixteen possible combinations allow a one-to-one mapping of 4-bit binary values 515 to the constellation points 510. Thus, construction of a 16-QAM symbol requires the "mapping" of 4-bit values 515 to constellation points 510.

Figure 6:
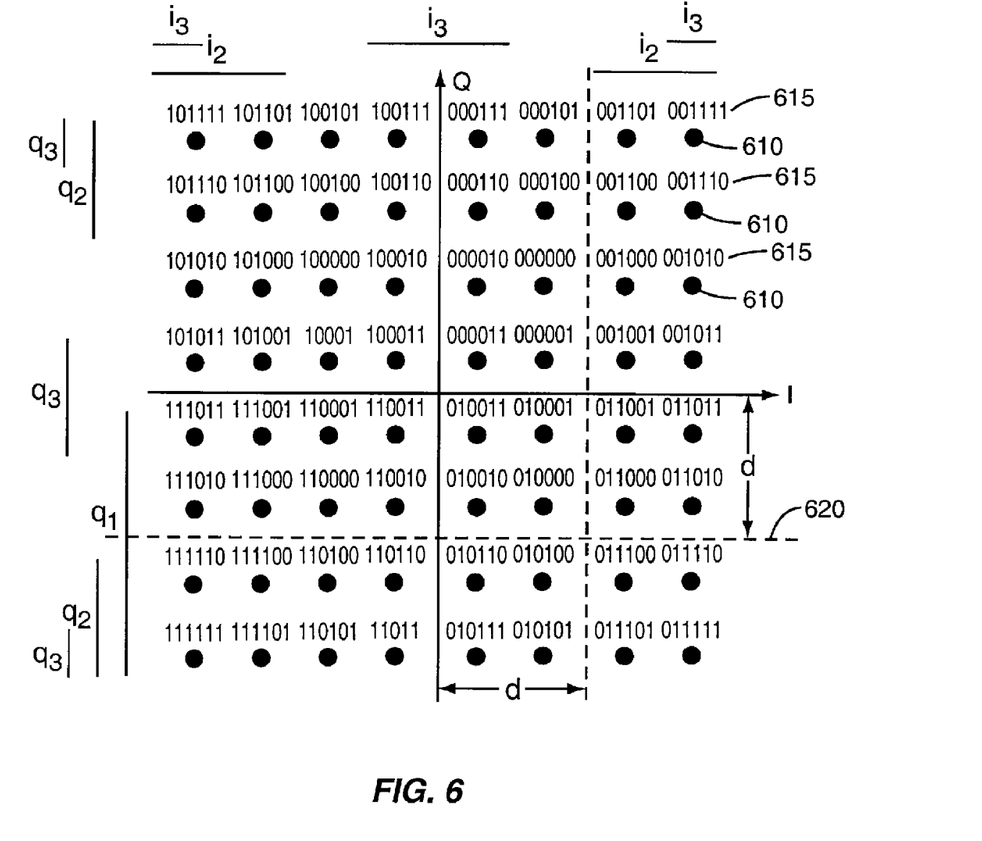
FIG. 6 illustrates a 64-QAM modulation constellation.

FIG. 6 illustrates the mapping of 6-bit binary values 615 to constellation points 610 in a 64-QAM signal. Although the signal constellation is more complex, the modulation and demodulation principles are the same.

In OFDM receiver 120, the signals received at each antenna 130 may be represented as $Y_i(k, n_{sym})$, the frequency-domain version of the received, sampled, digital base-band signal $y_i(n)$. The index i designates the i-th receive antenna, n the time-domain sample, and $n_{sym}$ the OFDM symbol. Propagation channel estimates (which may be obtained by methods well known to those skilled in the art) in the frequency domain corresponding to the i-th receiver antenna, j-th antenna, and OFDM tone k may be represented by $H_{i,j}^{PcE}(k, n_{sym})$. Note that the propagation channel estimates may vary with time, and are thus indexed for each OFDM symbol $n_{sym}$.

Received signal components $Y_i(k, n_{sym})$ are combined to form received symbols. If combining weights are constructed from the propagation channel estimates according to $$W_{i,j}^{PcE}(k, n_{sym}) = \frac{H_{i,j}^{PcE}(k, n_{sym})}{I_i(n_{sym})},$$

where $I_i(n_{sym})$ represents the received interference-plus-noise corresponding to OFDM symbol $n_{sym}$, then the soft values for the received symbols will be:

$$S_j(k, n_{sym}) = \sum_{i=1}^{N_{Rx}} (W_{i,j}^{PcE}(k, n_{sym}))^* Y_i(k, n_{sym}). \quad \text{Eq. (1)}$$

(Recall that $N_{RX}$ is the number of receive antennas 130. The operator ( )* denotes the complex conjugate operation.)

Note that Equation (1) represents a relatively simple approach to constructing soft symbol values. In particular, Equation (1) does not compensate for inter-cell interference, i.e. the inter-cell interference is assumed to be white. In addition, the combining weights of Equation (1) are constructed by scaling the propagation channel estimates inversely with the received interference-plus-noise $I_i(n_{sym})$. Using this approach, received signal components with less interference will contribute more to the combined symbol value, while components having the highest interference will contribute relatively less. Those skilled in the art will recognize that a variety of methods for constructing combining weights and for combining the received signal components are possible, and will appreciate the tradeoffs between complexity and performance accruing to those methods.

In order to de-map the symbols, i.e. to convert the symbols into soft bit values, the receiver 120 must have information about the amplitude of the received symbols. Specifically, receiver 120 must estimate decision boundaries for use in de-mapping the QAM symbols and obtaining soft bit values. Referring to FIG. 5, the dotted line denoted by 530 represents one possible decision boundary, separated from the I-axis by distance d. Given perfect information about the amplitude of the received symbols, decision boundary 530 is ideally placed along a line exactly halfway between the top row of constellation points 515 and the next row. A similar decision boundary may be placed between successive rows, and corresponding decision boundaries, including decision boundary 540, are placed between columns of constellation points.

Generating soft bit values from received symbols comprises comparing the real and imaginary parts of the received symbol values (corresponding to the I and Q axes, respectively) to the decision boundaries. For example, if the real and imaginary parts of the received 16-QAM symbol each are greater than d, then the symbol most likely corresponds to the constellation point 510 in the right-hand uppermost position, labeled with binary value 515 of "0011".

Referring now to FIG. 6, decision boundary 620 is situated between rows of constellation points 610 in the lower half of the figure. Other decision boundaries will fall between rows of constellation points 610, at spacings of d/2, as well as between the columns of constellation points 610. For this 64-QAM constellation, soft bit values may be generated as follows:

$$i_1 = \text{Re}S_j(k, n_{sym})$$

$$q_1 = \text{Im}S_j(k, n_{sym})$$

$$i_2 = \begin{cases} \kappa_1(d - \text{Re}S_j(k, n_{sym})), & \text{Re}S_j(k, n_{sym}) > 0, \\ \kappa_1(d + \text{Re}S_j(k, n_{sym})), & \text{Re}S_j(k, n_{sym}) \leq 0, \end{cases}$$

$$q_2 = \begin{cases} \kappa_1(d - \text{Im}S_j(k, n_{sym})), & \text{Im}S_j(k, n_{sym}) > 0, \\ \kappa_1(d + \text{Im}S_j(k, n_{sym})), & \text{Im}S_j(k, n_{sym}) \leq 0, \end{cases}$$

$$i_3 = \begin{cases} \kappa_2(\text{Re}S_j(k, n_{sym}) - d/2), & \text{Re}S_j(k, n_{sym}) > 0, \\ \text{Re}S_j(k, n_{sym}) < d, \\ -\kappa_2(\text{Re}S_j(k, n_{sym}) + d/2), & \text{Re}S_j(k, n_{sym}) \leq 0, \\ \text{Re}S_j(k, n_{sym}) > -d \\ \kappa_2(3d/2 - \text{Re}S_j(k, n_{sym})), & \text{Re}S_j(k, n_{sym}) \geq d, \\ \kappa_2(3d/2 + \text{Re}S_j(k, n_{sym})), & \text{Re}S_j(k, n_{sym}) \leq -d, \end{cases}$$

$$q_3 = \begin{cases} \kappa_2(\text{Im}S_j(k, n_{sym}) - d/2), & \text{Im}S_j(k, n_{sym}) > 0, \\ \text{Im}S_j(k, n_{sym}) < d, \\ -\kappa_2(\text{Im}S_j(k, n_{sym}) + d/2), & \text{Im}S_j(k, n_{sym}) \leq 0, \\ \text{Im}S_j(k, n_{sym}) > -d \\ \kappa_2(3d/2 - \text{Im}S_j(k, n_{sym})), & \text{Im}S_j(k, n_{sym}) \geq d, \\ \kappa_2(3d/2 + \text{Im}S_j(k, n_{sym})), & \text{Im}S_j(k, n_{sym}) \leq -d, \end{cases}$$

Eq. (2)

where negative values for $i_1$, $i_2$, $i_3$, $q_1$, $q_2$, $q_3$ correspond to a "0" bit and positive values to a "1" bit. Note also that the binary values 615 in FIG. 6 represent six transmitted bits $(b_1, \ldots, b_6) = (i_1, q_1, i_2, q_2, i_3, q_3)$.

Those skilled in the art will appreciate that soft bit values generated by comparing symbol values to decision boundary estimates may comprise estimates of the binary values as well as decision metrics, which correspond to the uncertainty inherent in the soft bit value generation. In Equation (2), the magnitudes of the computed soft bits, which represent the distances between the measured symbol and the closest decision boundaries, provide decision metrics. Constants $\kappa_1$ and $\kappa_2$ may be adjusted (preferably to values less than 1), to reflect the higher uncertainty of producing bits $i_2$, $q_2$, $i_3$, $q_3$ as compared to $i_1$, $q_1$. These soft bit values, comprising decision metrics, may then be decoded using, for example, a Viterbi decoder, as is well known in the art.

The preceding description of de-mapping symbols assumed that receiver 120 had perfect information about the amplitude of the received symbols, so that it could accurately determine decision boundaries for use in soft bit calculation. Specifically, referring to FIGS. 5 and 6, receiver 120 must know the value of d in order to determine those decision boundaries.

In practice, receiver 120 must estimate the value of d (or other parameter corresponding to the symbol amplitude). Referring once more to FIGS. 5 and 6, it can be easily demonstrated that the value d is equal to the average of the distances between each of the constellation points 515 (or 615) and the I-axis and Q-axis, respectively. In the discussion that follows, these distances are called "modulation distances". Accordingly, given a set of symbols N, which contains N symbols, then an estimate for the value of d can be computed from measured modulation distances. That is, $$d = \frac{1}{2N} \sum_{n_{sym} \in N} |\text{Re}S(n_{sym})| + |\text{Im}S(n_{sym})|.$$

However, as discussed above, the received symbol amplitude will vary over time, as well as across OFDM tones 260, due to distortion of the transmitted signal by the propagation channel 150. As a result, estimation of d must be repeated, or updated, over time, and must also take into account the frequency selectivity of the propagation channel 150.

In exemplary receiver 120, the estimate of d is computed and/or updated at each sub-frame interval. As noted above, a typical sub-frame might have a duration of 0.5 milliseconds, and comprise 6 or 7 symbols. A separate value for the estimate of d is computed and maintained for each OFDM tone 260, or at least for each group of OFDM tones 260.

Figure 7:
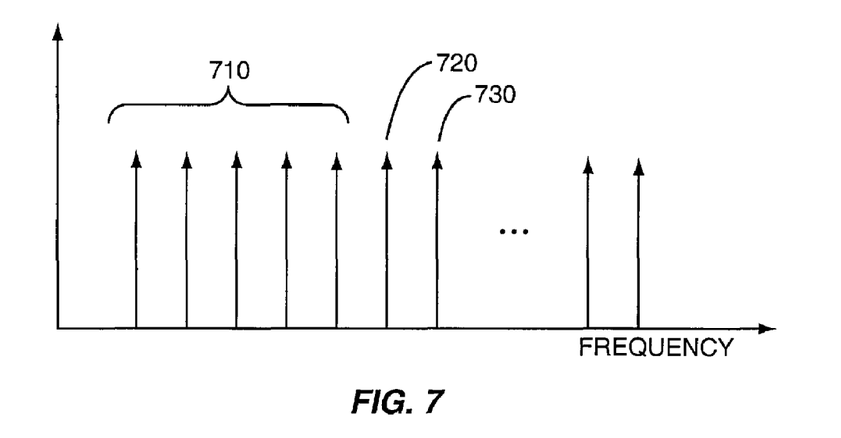
FIG. 7 illustrates frequency tones corresponding to an OFDM signal.

Referring to FIG. 7, a group of OFDM tones is designated by reference symbol 710. Because this tone group 710 comprises a relatively small number of tones 260, amplitude differences between the individual tones 260 resulting from frequency selectivity of the propagation channel 150 will be relatively small. In other words, there exists a number of tones $N_{amp}$, which is considerably smaller than the total number of tones, across which frequency selectivity can be ignored. If several symbols are selected from each of the tones within tone group 710, the modulation distances may be averaged to estimate a value for d. This value is used in Equation (2) to generate soft bit values for 64-QAM symbols modulated onto each of the tones in tone group 710.

Given that the number of tones $N_{amp}$ in tone group 710 is relatively small, the estimate for d obtained from the symbols of tone group 710 is also useful for generating soft bit values for symbols from tone 720, which is adjacent to tone group 710. This estimate might still be useful for generating soft bit values for symbols from next-adjacent tone 730, but the usefulness of the estimate diminishes as it is applied to tones falling farther from the tones from which the estimate was derived. (Note that while FIG. 7 illustrates tone 720 as immediately adjacent to tone group 710, the term "adjacent" is used herein to mean "nearby," rather than "immediately proximate." Likewise, "next-adjacent tone" refers to a tone that is farther away than an adjacent tone, but still relatively nearby.)

Accordingly, the estimate of d derived from tone group 710 may be applied to the de-mapping of symbols from adjacent tone 720, but should be updated before being used to de-map symbols from next-adjacent tone 730. As will be shown below, the estimate of d may be updated during the de-mapping of symbols from adjacent tone 720, using measurements of those symbols. The updated estimate may then be used to de-map symbols from next-adjacent tone 730, and then updated again, using the symbols from the next-adjacent tone 730, before application to the next tone. In this manner, each tone may be de-mapped in turn, using an estimated value of d appropriately updated for that tone's position within the OFDM signal.

Figure 8:
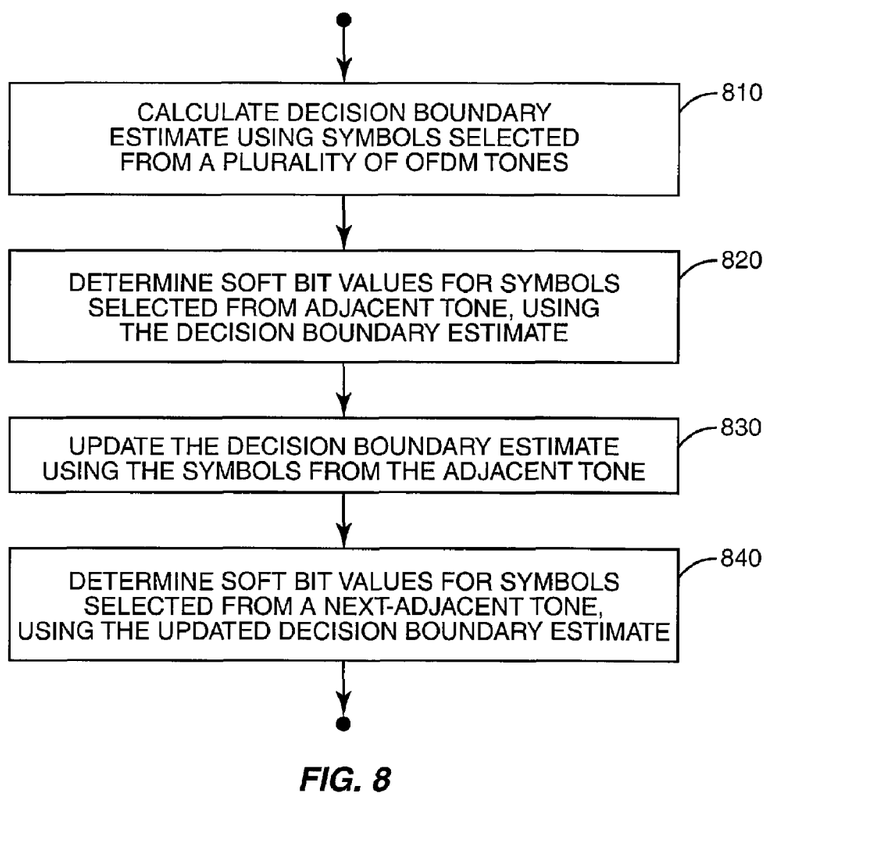
FIG. 8 is a flow diagram illustrating the determining of soft bit values from OFDM symbols.

FIG. 8 thus illustrates an exemplary method for determining soft bit values for QAM-modulated symbols in an OFDM receiver. Although only 16-QAM and 64-QAM modulation have been discussed, the method is generally applicable to QAM schemes. 64-QAM symbols are assumed in the following description.

At block 810, a decision boundary estimate is calculated using (QAM-modulated) symbols selected from a plurality of OFDM tones 710. As discussed above, the number of tones $N_{amp}$ is selected so that frequency selectivity across the tone group 710 is minimal. $N_{amp}$ will often be a static parameter, determined from an assessment of the signal conditions expected to be encountered by the receiver. Alternatively, $N_{amp}$ can be determined dynamically in the receiver, by analyzing the observed frequency selectivity. For example, pilot channel data might be analyzed to estimate the frequency response of the propagation channel 150.

In any event, the selected received symbols from the tone group 710 may comprise all or a subset of the symbols 430 included in one sub-frame 420 of the OFDM signal, but the total number of symbols selected should be large enough to give a reasonably accurate estimate of d. So, for each tone in tone group 710 indexed by $k_{start} \leq k < N_{amp} + k_{start}$, calculate:

$$\hat{d}(k) = \sum_{n_{sym} \in N_{sym}(k)} |\text{Re} S_j(k, n_{sym})| + |\text{Im} S_j(k, n_{sym})|, \quad \text{Eq. (3)}$$

where $N_{sym}(k)$ is the set of symbols selected from tone k for the current sub-frame. Note that $\hat{d}(k)$ of Equation (3) represents the sum of modulation distances for the selected symbols in tone k, not the average.

If $N_{sym}(k)$ is the number of symbols in each set $N_{sym}(k)$, then the average modulation distance for the tone group 710 may be computed as:

$$d_{average} = \frac{1}{2N_{sum}} \sum_{k=\hat{k}}^{\hat{k}+N_{amp}-1} \hat{d}(k), \text{ where } N_{sum} = \sum_{k=\hat{k}}^{\hat{k}+N_{amp}-1} N_{sum}(k).$$

That is, $d_{average}$ is the average modulation distance in the sub-frame over the $N_{amp}$ tones of tone group 710. This average is stored for future use, and is also used as an estimate of d for each of the tones in tone group 710. Thus: $d(k)=d_{average}$, for $k_{start} \leq k < N_{amp} + k_{start}$.

The values d(k) corresponding to tone group 710 are used to estimate decision boundaries for de-mapping QAM symbols from each of the tones in tone group 710. As discussed above, for 64-QAM symbols, decision boundaries are spaced at intervals of d/2 between the rows and columns of the constellation diagram of FIG. 6. These decision boundaries are implicit in the formulas for generating soft bit values given by Equation (2). Thus, d(k), as derived above, is substituted for d in Equation (2), to generate soft bit values for the symbols of tone group 710.

If the average modulation distance derived above is derived for the first time, the value $d_{average}$ is used for each tone of tone group 710. If a decision boundary estimate was calculated for a prior sub-frame 410, the averages may optionally be filtered, or smoothed. In other words, information from the prior decision boundary estimate is incorporated into the determination of the current decision boundary estimate. For example, if the prior average modulation distance for tone k is $d_{old}(k)$, then a current value may be computed as the weighted sum of the prior and value and the current average modulation distance:

$$d(k) = \lambda(d_{average} - d_{old}(k)) + d_{old}(k), \quad \text{Eq. (4)}$$

where $\lambda$ equals a filter constant selected to be between zero and one. The value of $\lambda$ may depend upon the Doppler frequency observed at the receiver, and should be closer to one for environments where the signal amplitude is changing rapidly over time.

In particular, if the receiver has been signaled or otherwise determines that the transmitted signal amplitude has changed between sub-frames, $\lambda$ should be set to 1. Alternatively, if the receiver knows or is able to determine the magnitude of the change in the transmitted amplitude, then $d_{old}(k)$ may be scaled to compensate for the amplitude change, and the scaled $d_{old}(k)$ is applied in Equation (4).

In any event, once the symbols from tone group 710 have been de-mapped using d(k), the symbol data can be discarded. Thus, only minimal memory is required for buffering symbol data after combining. The values for d(k) are retained, at least until the next sub-frame is processed, but the symbol data can be discarded. The soft bits resulting from the de-mapping process are scaled, quantized, and buffered as necessary for subsequent de-interleaving and decoding.

As discussed above, decision boundaries determined for a small tone group 710 are useful for de-mapping symbols from an adjacent tone 720. Accordingly, block 820 of FIG. 8 depicts the determination of soft bit values from symbols selected from an adjacent tone 720, using the decision boundary estimate calculated at block 810. Again, the selected symbols might comprise all or a subset of the symbols contained in the sub-frame. The selection may depend, for example, on which symbols are allocated to a particular logical channel or resource block.

In any case, if the adjacent tone 720 is immediately adjacent to tone group 710, as illustrated in FIG. 7, and is indexed by $\hat{k}$, then $d(\hat{k}-1)$ is used to de-map the symbols selected from adjacent tone 720. Equation (2) is used to generate soft bit values, with decision boundary estimate $d(\hat{k}-1)$ substituted for d in Equation (2).

As the selected symbols of adjacent tone 720 are processed, amplitude information from the symbols is incorporated into an update of the current decision boundary estimate, as illustrated at block 830 of FIG. 8. First, the modulation distances for the selected symbols of tone $\hat{k}$ are summed:

$$\hat{d}(\hat{k}) = \sum_{n_{sym} \in N_{sym}(\hat{k})} |\text{Re}S_j(\hat{k}, n_{sym})| + |\text{Im}S_j(\hat{k}, n_{sym})|. \quad \text{Eq. (5)}$$

The previously stored $d_{average}$ variable is then updated. If $d_{old\_average}$ is the previously stored value of $d_{average}$, and $N_{old\_sum}$ is the old value for the number of symbols $N_{sum}$ used in computing $d_{old\_average}$, then:

$$N_{sum} = N_{sym}(\hat{k}) + N_{old\_sum} - N_{sym}(\hat{k} - N_{amp}), \text{ and}$$

$$d_{average} = \frac{1}{2N_{sum}} (\hat{d}(\hat{k}) + 2N_{old\_sum} d_{old\_average} - \hat{d}(\hat{k} - N_{amp})).$$

This updating of $d_{average}$ incorporates amplitude information from the current tone $\hat{k}$, while discarding amplitude information from the tone farthest away from tone $\hat{k}$, i.e. tone ($\hat{k}-N_{amp}$). Hence, $d_{average}$ represents a rolling average modulation distance for a moving window of tones, the window covering $N_{amp}$ tones at any given time. This updated value of $d_{average}$ is retained as the decision boundary estimate for the current tone $\hat{k}$, that is: $d(\hat{k})=d_{average}$.

Optionally, if an updated decision boundary estimate was computed for the current tone in a previous sub-frame, the prior updated decision boundary estimate may be combined with the currently updated $d_{average}$ to form a filtered, or smoothed, decision boundary estimate. Accordingly, if $d_{old}(\hat{k})$ is defined as the prior decision boundary estimate, then $d(\hat{k})$ may be computed as $d(\hat{k})=\lambda(d_{average}-d_{old}(\hat{k}))+d_{old}(\hat{k})$. Again, $\lambda$ represents a filter constant, between one and zero, which is selected based on the expected variation in signal amplitude from sub-frame to sub-frame. If the transmission amplitude is known to have changed since the prior sub-frame, $\lambda$ should be set to one.

Once a received symbol has been de-mapped, and its magnitude information incorporated into the rolling average $d_{average}$, the symbol data itself may be discarded. The soft bits resulting from the de-mapping process are again scaled and buffered as necessary, for subsequent de-interleaving and decoding.

Next, block 840 illustrates the determination of soft bits from symbols selected from the next-adjacent tone 730, using the updated decision boundary estimate $d_{average}$. If $\hat{k}$ is incremented so that it references next-adjacent tone 730, then the symbols from next-adjacent tone 730 are de-mapped using $d(\hat{k}-1)$, which is the updated decision boundary estimate derived from the original tone group 710 and updated with amplitude information from the adjacent tone 720. Soft bits are generated for next-adjacent tone 730, using this updated decision boundary estimate, as described above. As before, symbol amplitude information is used to update the decision boundary estimate again, after which the symbol data may be discarded.

The method described above of processing the received signal one tone at a time, while updating the decision boundary estimate with new information from the current tone, may be repeated until all tones have been processed. The entire process may be repeated for the next sub-frame, optionally using prior decision boundary estimates specific to each tone to smooth new estimates.

A number of variations of the above-described method are possible. For example, under certain circumstances, the entire process may need to be re-started before reaching the last tone in the group. Consider that the initial group of tones 710 is selected to provide an adequate number of symbols to form an accurate estimate of the decision boundary. Recall that the number of symbols used to form the initial estimate was denoted above as $N_{sum}$. Each time the decision boundary estimate is updated, amplitude information from symbols of the current tone are added, while amplitude information from the "oldest" tone in the running average, $d_{average}$ is dropped. The total number of symbols corresponding to $d_{average}$ may thus change, depending on how many symbols are in each of the added and dropped tone. If the total number of symbols $N_{sum}$ becomes too low, because significantly more symbols are dropped than are added, then that total number of symbols $N_{sum}$ may be inadequate to provide an accurate decision boundary estimate.

In this event, one solution is to restart the process at the current tone in the signal. That is, a new group of tones is selected to form a new initial average $d_{average}$, and processing of tones begins again as described above. Alternatively, the decision boundary estimate may be updated with information from additional tones, so as to bring $N_{sum}$ to an adequate point. However, this latter approach effectively widens the window over which the average is taken. If this window is too wide, then frequency selectivity of the propagation channel 150 may cause inaccuracies in the decision boundary estimate.

In other cases, a certain tone may not include any symbols for use by receiver 120, perhaps because that tone has been designated for another user. In this case, symbol data for that tone is likely not stored, and thus not available for processing. It should be apparent from the preceding discussion that skipping a tone will normally have no significant impact on the accuracy of the soft bit generation process. The process described above will still generally apply, except that the tone succeeding the skipped tone will be processed with a decision boundary estimate corresponding to the last processed tone. Thus, if one tone has been skipped, and the current tone is indexed by $\hat{k}$, then the decision boundary estimate $d(\hat{k}-2)$ is used for soft bit generation. Updating the decision boundary estimate with symbols from the current tone is performed as earlier described, but with appropriate modifications to the indices involved.

In the preceding discussion, processing of tones was performed on a sub-frame by sub-frame basis. That is, symbols from a given tone were processed for an entire sub-frame before moving on to the next tone. Accordingly, a single decision boundary estimate was formed for each tone during each sub-frame interval. As discussed, prior estimates could be retained until the next sub-frame interval and used to filter succeeding estimates corresponding to the same tone.

For certain OFDM signal structures, it may be necessary or desirable to perform the methods described herein, but proceeding one OFDM symbol interval at a time, rather than sub-frame by sub-frame. For instance, adjacent symbols within a given tone may be allocated to different resource blocks and may have been transmitted with different transmission amplitudes. Unless amplitude information from one or the other of these symbols is compensated accordingly, the amplitude information should not be combined. As discussed earlier, if the transmission amplitude difference is known, information from one or more symbols can be scaled to compensate for the difference. In this case, the amplitude information can be combined to form the decision boundary estimate. In other cases, however, the transmission amplitude difference will not be known. In this event, the methods described above may be used separately for each resource block, or for each group of symbols known to have been transmitted at the same amplitude.

Finally, in some instances it may be desirable to refine the decision boundary estimates using information in addition to the modulation distance information discussed above. For instance, a receiver 120 typically analyzes pilot symbol data to estimate propagation channel characteristics. Estimates of the observed signal-to-interference ratio (SIR) corresponding to each receive antenna 130 are typically produced, on a tone-by-tone basis. These estimates comprise additional information about the received signal amplitude for each tone. Scaled appropriately, this information may be combined with the decision boundary estimates derived according to the above methods to produce a refined decision boundary estimate. For instance, a refined decision boundary estimate may be computed as a weighted sum of $d_{average}$ and an amplitude value derived from SIR information.

Figure 9:
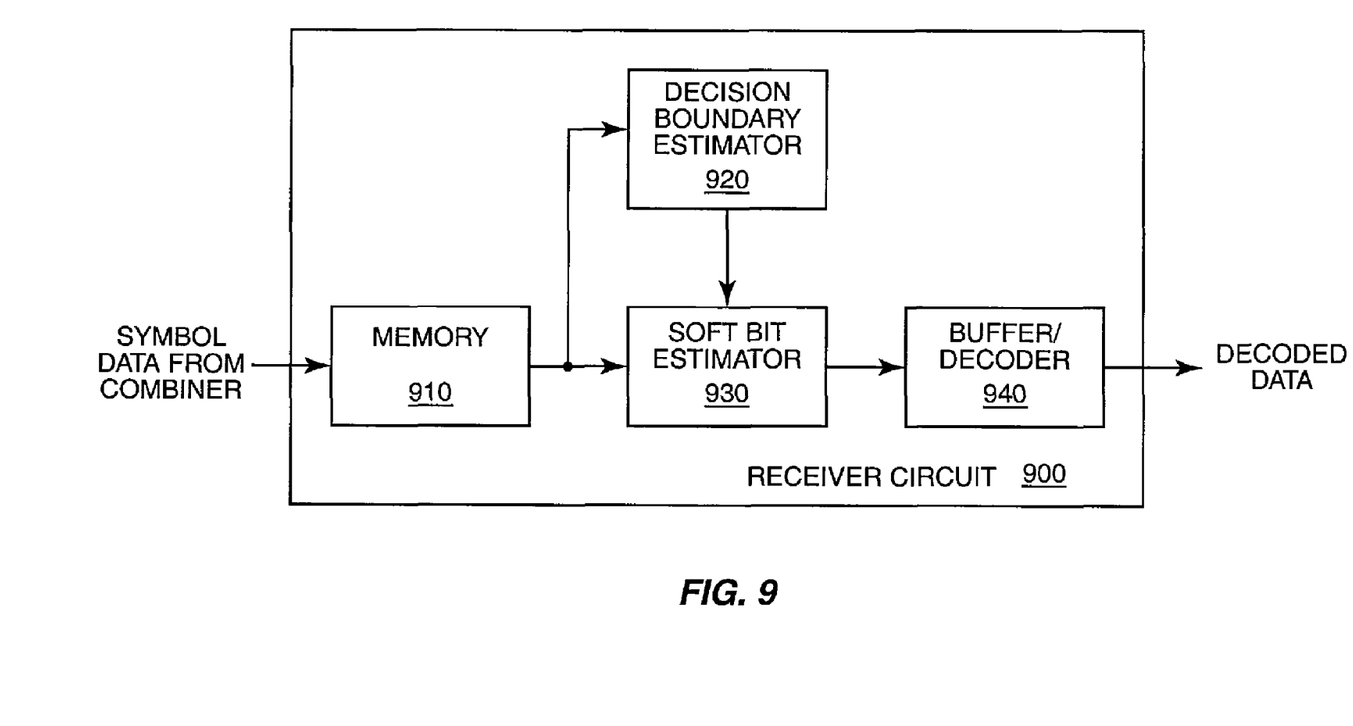
FIG. 9 is a block diagram of one embodiment of an OFDM receiver circuit configured to determine soft bit values.

One or more of the methods described above are performed by the receiver circuit functional blocks pictured in FIG. 9. Receiver circuit 900 is a subsystem of receiver 120, and includes memory 910, decision boundary estimator 920, soft bit estimator 930, and buffer/decoder 940.

Memory 910 stores symbol data produced by a combiner (not shown). As explained above, OFDM signals transmitted by one or more transmit antennas 110 are received at receive antennas 130. (See FIG. 1.) Using combining weights derived from propagation channel estimates, the combiner produces symbol data from the received signals; this symbol data is stored in memory 910 for processing.

Decision boundary estimator 920 retrieves symbol data from memory 910 for producing decision boundary estimates in accordance with the above-described methods. The decision boundary estimator 920 is thus configured to calculate a decision boundary estimate using symbols selected from a plurality of tones, such as tone group 710. The decision boundary estimator 920 is further configured to update the decision boundary estimate using symbol data (retrieved from memory 910) corresponding to an adjacent tone 720. The decision boundary estimator 920 continues to update the decision boundary estimate as subsequent tones are processed, providing each estimate to soft bit estimator 930.

Soft bit estimator 930 uses the decision boundary estimates calculated by decision boundary estimator 920 to determine soft bit values. Soft bit estimator 930 retrieves symbol data for the initial tone group 710 from memory 910, and processes those symbols using the initial decision boundary estimate. Soft bit estimator 930 next retrieves symbol data for adjacent tone 720, and processes those symbols, also using the initial decision boundary estimate. (These symbols are simultaneously used by decision boundary estimator 920 to update the decision boundary estimate.) Soft bit estimator 930 continues by proceeding to a next-adjacent tone 730, using the updated decision boundary estimate provided by decision boundary estimator 920 to generate soft bit values for the next adjacent tone. As discussed above, this processing by decision boundary estimator 920 and soft-bit estimator may continue until all tones have been processed, at which point the process may start again with the next sub-frame.

Soft bit values determined by soft bit estimator 930 are provided to buffer/decoder 940. Buffer/decoder may perform, among other functions, de-interleaving and decoding, as necessary, to reconstruct the originally transmitted data.

It should be noted once again that symbol data, which is buffered in memory 910, may be discarded after it has been used by the decision boundary estimator 920 and soft bit estimator 930. Accordingly, the memory 910 allocated to symbol data for soft bit generation need only be large enough to accommodate the symbols necessary to form the initial decision boundary estimate from the initial tone group 720. Although decision boundary estimates are retained from one sub-frame interval to the next, only one value for each tone is needed. Thus, the described receiver circuit 900 makes efficient use of memory 910 resources.

In addition to the depicted functional blocks, the receiver circuit 900 pictured in FIG. 9 will also include or be combined with additional baseband processing circuits (not shown), providing functions such as supervising the previously discussed circuits, managing memory, interfacing with other operating circuitry, performing higher level communications functions, etc. In particular, receiver circuit may comprise or be combined with a propagation channel estimation circuit and a SIR estimator, the latter configured to estimate a signal-to-interference ratio corresponding to one or more OFDM tones.

As will be readily understood, receiver circuit 900 and accompanying circuits may be implemented using digital hardware, microprocessors running software, or a combination of both. The circuits may comprise specialized or general-purpose processors, or digital signal processors (DSP), or one or more of each. Receiver circuit 900 may further be combined with transmitter circuitry to provide a complete transceiver device. This transceiver device may be configured as a portable, end-user terminal, such as a cellular radiotelephone, or as a fixed communications device.

With these and other variations and extensions in mind, those skilled in the art will appreciate that the foregoing description and the accompanying drawings represent non-limiting examples of the methods and apparatus taught herein for determining soft bit values for QAM-modulated symbols in an OFDM signal. As such, the present invention is not limited by the foregoing description and accompanying drawings. Instead, the present invention is limited only by the following claims and their legal equivalents.

What is claimed is:

1. A method of determining soft bit values for QAM-modulated symbols in an OFDM receiver, comprising:
   calculating a decision boundary estimate using first received symbols selected from a group of OFDM tones;
   determining first soft bit values corresponding to one or more second received symbols selected from an adjacent tone, using the decision boundary estimate, wherein the adjacent tone is adjacent to the group of OFDM tones;
   updating the decision boundary estimate using the one or more second received symbols; and
   determining second soft bit values corresponding to one or more third received symbols selected from a next-adjacent tone, using the updated decision boundary estimate, wherein the next-adjacent tone is adjacent to the adjacent tone and further removed from the group of OFDM tones than the adjacent tone.

2. The method of claim 1, wherein calculating a decision boundary estimate comprises determining an average modulation distance using the one or more first received symbols and calculating the decision boundary estimate based on the average modulation distance.

3. The method of claim 2, wherein calculating a decision boundary estimate further comprises estimating a signal-to-interference ratio corresponding to one or more of the group of OFDM tones and calculating the decision boundary estimate based on the signal-to-interference ratio.

4. The method of claim 3, further comprising calculating the decision boundary estimate based on a weighted sum of the average modulation distance and the signal-to-interference ratio.

5. The method of claim 2, wherein calculating the decision boundary estimate based on the average modulation decision boundary estimate further comprises calculating the decision boundary estimate based on a prior decision boundary estimate, wherein the prior decision boundary estimate was calculated using symbols obtained during a prior measurement interval.

6. The method of claim 5, further comprising detecting a transmitted amplitude change occurring after the prior decision boundary estimate was determined, wherein calculating the decision boundary estimate further comprises calculating the decision boundary estimate based on the transmitted amplitude change.

7. The method of claim 5, wherein calculating the decision boundary estimate comprises calculating a weighted sum of the average modulation distance and the prior decision boundary estimate.

8. The method of claim 2, wherein updating the decision boundary estimate comprises computing a rolling average modulation distance using the one or more first received symbols and the one or more second received symbols and calculating the updated decision boundary estimate based on the rolling average modulation distance.

9. The method of claim 8, wherein computing a rolling average modulation distance comprises:
  summing modulation distances corresponding to the one or more first received symbols to obtain a first sum;
  summing modulation distances corresponding to the one or more second received symbols to obtain a second sum;
  summing modulation distances corresponding to the one or more first received symbols from the tone of the group of OFDM tones farthest in frequency from the adjacent tone to obtain a third sum; and
  calculating the rolling average modulation distance by adding the first sum to the second sum and subtracting the third sum to obtain a rolling modulation sum, and dividing the rolling modulation sum by twice the number of symbols corresponding to the rolling modulation sum.

10. The method of claim 8, wherein calculating an updated decision boundary estimate based on the rolling average modulation distance further comprises calculating the updated decision boundary estimate based on a prior updated decision boundary estimate, wherein the prior updated decision boundary estimate was determined using symbols obtained from the adjacent tone during a prior measurement interval.

11. The method of claim 1, wherein the adjacent tone is immediately adjacent to the group of OFDM tones.

12. The method of claim 1, further comprising:
  detecting a transmitted amplitude difference between successive OFDM tones;
  forming a scaled decision boundary estimate based on the detected transmitted amplitude difference; and
  determining soft bit values corresponding to symbols selected from one of the successive OFDM tones using the scaled decision boundary estimate.

13. A receiver circuit configured to determine soft bit values for QAM-modulated symbols in an OFDM signal, comprising:
  a decision boundary estimator configured to calculate a decision boundary estimate using first received symbols selected from a group of OFDM tones and to update the decision boundary estimate using second received symbols from an adjacent tone; and
  a soft bit estimator configured to:
    determine first soft bit values corresponding to the second received symbols using the decision boundary estimate; and
    determine second soft bit values, corresponding to third received symbols selected from a next-adjacent tone, using the updated decision boundary estimate,
  wherein the adjacent tone is adjacent to the group of OFDM tones and the next-adjacent tone is adjacent to the adjacent tone and further removed from the group of OFDM tones than the adjacent tone.

14. The receiver circuit of claim 13, wherein the decision boundary estimator is configured to calculate the decision boundary estimate by determining an average modulation distance using the one or more first received symbols and calculating the decision boundary estimate based on the average modulation distance.

15. The receiver circuit of claim 14, further comprising an SIR estimator configured to estimate a signal-to-interference ratio corresponding to one or more of the group of OFDM tones, wherein the decision boundary estimator is further configured to calculate the decision boundary estimate based on the signal-to-interference ratio.

16. The receiver circuit of claim 15, wherein the decision boundary estimator is configured to calculate the decision boundary estimate based on a weighted sum of the average modulation distance and the signal-to-interference ratio.

17. The receiver circuit of claim 14, wherein the decision boundary estimator is configured to calculate the decision boundary estimate based on a prior decision boundary estimate, wherein the prior decision boundary estimate was calculated using symbols obtained during a prior measurement interval.

18. The receiver circuit of claim 17, wherein the decision boundary estimator is configured to calculate a weighted sum of the average modulation distance and the prior decision boundary estimate to obtain the decision boundary estimate.

19. The receiver circuit of claim 14, wherein the decision boundary estimator is configured to update the decision boundary estimate by computing a rolling average modulation distance using the one or more first received symbols and the one or more second received symbols and calculating the updated decision boundary estimate based on the rolling average modulation distance.

20. The receiver circuit of claim 19, wherein the decision boundary estimator is configured to:
  sum modulation distances corresponding to the one or more first received symbols to obtain a first sum;
  sum modulation distances corresponding to the one or more second received symbols to obtain a second sum;
  sum modulation distances corresponding to the one or more first received symbols from the tone of the group of OFDM tones farthest in frequency from the adjacent tone to obtain a third sum; and
  calculate the rolling average modulation distance by adding the first sum to the second sum and subtracting the third sum to obtain a rolling modulation sum, and dividing the rolling modulation sum by twice the number of symbols corresponding to the rolling modulation sum.

21. The receiver circuit of claim 19, wherein the decision boundary estimator is configured to calculate the updated decision boundary estimate based on a prior updated decision boundary estimate, wherein the prior updated decision boundary estimate was determined using symbols obtained from the adjacent tone during a prior measurement interval.

* * * * *

UNITED STATES PATENT AND TRADEMARK OFFICE
CERTIFICATE OF CORRECTION

PATENT NO. : 7,889,800 B2
APPLICATION NO. : 11/755887
DATED : February 15, 2011
INVENTOR(S) : Jonsson Page 1 of 1

It is certified that error appears in the above-identified patent and that said Letters Patent is hereby corrected as shown below:

In Column 5, Line 61, in Equation (2), delete "-d" and insert -- -d, --, therefor.

Signed and Sealed this
Twenty-fourth Day of May, 2011

David J. Kappos
*Director of the United States Patent and Trademark Office*